(12) United States Patent
Ota

(10) Patent No.: US 12,331,783 B2
(45) Date of Patent: Jun. 17, 2025

(54) MAGNETIC CIRCUIT DEVICE FOR MAGNETIC BEARING

(71) Applicant: SHIN-ETSU CHEMICAL CO., LTD., Tokyo (JP)

(72) Inventor: Hiroyuki Ota, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 113 days.

(21) Appl. No.: 18/327,554

(22) Filed: Jun. 1, 2023

(65) Prior Publication Data

US 2023/0400058 A1 Dec. 14, 2023

(30) Foreign Application Priority Data

Jun. 9, 2022 (JP) ................................. 2022-093856

(51) Int. Cl.
*F16C 32/04* (2006.01)
(52) U.S. Cl.
CPC .................................. *F16C 32/0465* (2013.01)
(58) Field of Classification Search
CPC .............. F16C 32/0465; F16C 32/0425; F16C 32/0412
See application file for complete search history.

(56) References Cited

U.S. PATENT DOCUMENTS 7,723,884 B2 * 5/2010 Bauer ...................... H02K 7/09
310/156.04

FOREIGN PATENT DOCUMENTS

JP H08170644 A 7/1996
JP H08177857 A 7/1996
(Continued)

OTHER PUBLICATIONS

JP-2000230551-A_translate (Year: 2000).*
"Communication with European Search Report", EP Application No. 23178265.7, Oct. 17, 2023, 8 pp.

*Primary Examiner* — Tulsidas C Patel
*Assistant Examiner* — Mohammed Ahmed Qureshi
(74) *Attorney, Agent, or Firm* — Myers Bigel, P.A.

(57) ABSTRACT

In a magnetic circuit device for a magnetic bearing that includes a permanent magnet ring constituted by a plurality of permanent magnets and a soft magnetic material ring, the circumferential uniformity of the magnetic field near an axial end surface of the permanent magnet ring is enhanced. A magnetic circuit device for a magnetic bearing includes: a permanent magnet ring that is formed by disposing a plurality of anisotropic permanent magnets in a circumferential direction; a first soft magnetic material ring that contacts an outer circumferential surface of the permanent magnet ring; and a second soft magnetic material ring that contacts an inner circumferential surface of the permanent magnet ring. Each of the plurality of anisotropic permanent magnets is magnetized parallel to a straight line that passes through a center of the anisotropic permanent magnet and that extends in a radial direction. The entirety of the outer circumferential surface of the permanent magnet ring has homopolarity, and the entirety of the inner circumferential surface of the permanent magnet ring has homopolarity and has a reverse polarity of the outer circumferential surface of the permanent magnet ring. Grooves in an axial direction are formed on at least one of the first soft magnetic material ring and the second soft magnetic material ring.

4 Claims, 6 Drawing Sheets

(56) References Cited

FOREIGN PATENT DOCUMENTS

| JP | 2000230551 A | * | 8/2000 | ......... F16C 32/0438 |
| JP | 2002276659 A | | 9/2002 | |
| JP | 2014098424 A | | 5/2014 | |

* cited by examiner

MAGNETIC CIRCUIT DEVICE FOR MAGNETIC BEARING

CROSS-REFERENCE TO RELATED APPLICATION

This application claims priority under 35 USC § 119(a) to Japanese Patent Application No. 2022-093856 filed Jun. 9, 2022 in the Japan Patent Office, the entire disclosure of which is incorporated herein by reference in its entirety.

BACKGROUND OF THE INVENTION

Field of the Invention

The present invention relates to a magnetic circuit device for a magnetic bearing.

Description of Related Art

A superconductive magnetic bearing is a bearing that includes a ring-shaped superconductor portion and a ring-shaped permanent magnet portion, and that uses an omnidirectionally uncontrolled and stable magnetic suspension force by a flux pinning effect caused by the magnetic field generated by a permanent magnet and a superconductor. Compared to commonly used rolling bearings, there are advantages, for example, in that maintenance such as the lubrication of the bearing is unnecessary, service life is long, dust is not generated, and high-speed rotation is possible. Moreover, since there is no sliding or mechanical friction, there are advantages in that mechanical loss is not generated and a high efficiency can be realized.

A superconductive bearing device described in Japanese Patent Laid-Open No. 2014-98424 includes: a rotation shaft; a rotation body portion including a first magnet portion that is fixed to the rotation shaft and a second magnet portion that is fixed to the rotation shaft at a predetermined axial interval from the first magnet portion; and a fixation body portion including a superconductor that is disposed on the circumference of the rotation shaft between the first magnet portion and the second magnet portion and that includes a first facing surface facing the first magnet portion and a second facing surface facing the second magnet portion, and a cooling portion that exerts a pinning effect by cooling the superconductor. The first magnet portion includes a first permanent magnet that is disposed on the circumference of the rotation shaft and that includes a first magnetic pole surface facing the first facing surface, the second magnet portion is a second permanent magnet that is disposed on the circumference of the rotation shaft and that includes a second magnetic pole surface facing the second facing surface, and the polarity of the first magnetic pole surface and the polarity of the second magnetic pole surface are reversed.

In a magnetic circuit device for a magnetic bearing that includes a permanent magnet ring constituted by a plurality of permanent magnets and a soft magnetic material ring, the rotation efficiency can decrease in the case in which the magnetic field near an axial end surface of the permanent magnet ring is not uniform along the circumferential direction.

The present invention has been made in view of such circumstances, and has an object to enhance the circumferential uniformity of the magnetic field near the axial end surface of the permanent magnet ring in the magnetic circuit device for the magnetic bearing that includes the permanent magnet ring constituted by a plurality of permanent magnets and the soft magnetic material ring.

SUMMARY OF THE INVENTION

To achieve the object, a magnetic circuit device for a magnetic bearing according to an embodiment includes: a permanent magnet ring that is formed by disposing a plurality of anisotropic permanent magnets in a circumferential direction; a first soft magnetic material ring that contacts an outer circumferential surface of the permanent magnet ring; and a second soft magnetic material ring that contacts an inner circumferential surface of the permanent magnet ring. Each of the plurality of anisotropic permanent magnets is magnetized parallel to a straight line that passes through a center of the anisotropic permanent magnet and that extends in a radial direction. The entirety of the outer circumferential surface of the permanent magnet ring has homopolarity, and the entirety of the inner circumferential surface of the permanent magnet ring has homopolarity and has reverse polarity of the outer circumferential surface of the permanent magnet ring. Grooves in an axial direction are formed on at least one of the first soft magnetic material ring and the second soft magnetic material ring.

According to the present invention, it is possible to enhance the circumferential uniformity of the magnetic field near the axial end surface of the permanent magnet ring in the magnetic circuit device for the magnetic bearing that includes the permanent magnet ring constituted by a plurality of permanent magnets and the soft magnetic material ring.

DESCRIPTION OF PREFERRED EMBODIMENTS

Figure 1:
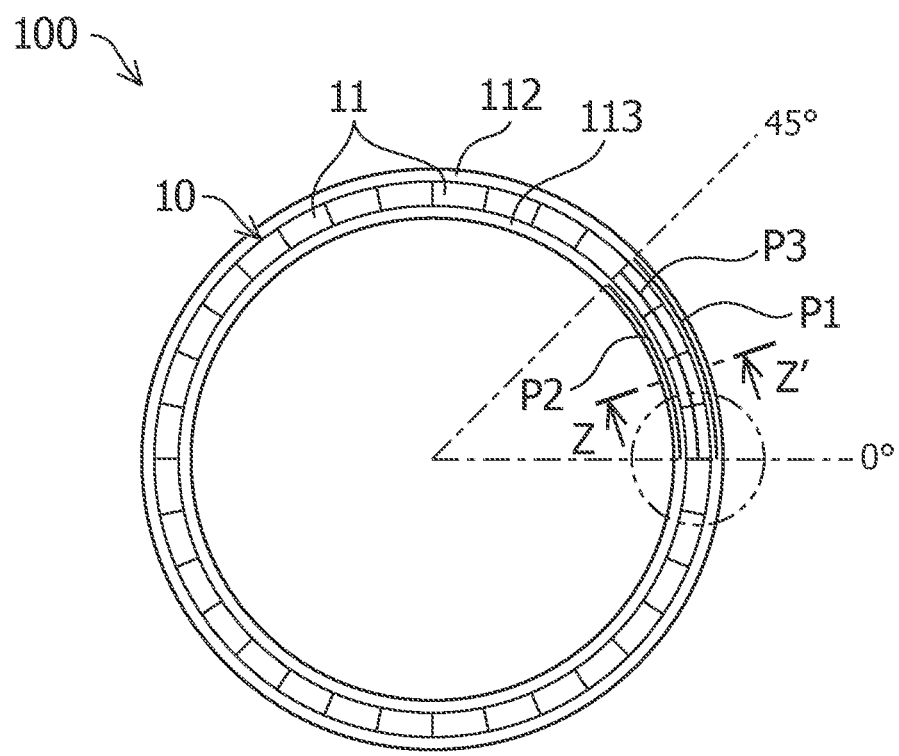
FIG. 1 is an elevational view of a magnetic circuit device for a magnetic bearing according to a research.

The present invention will be described below based on an illustrated embodiment. The present invention is not limited to the embodiment described below.

First, the inventor of the present invention has diligently performed research as follows.

A commercially available type II superconductive bulk magnet (YBCO, GdBCO, EuBCO or the like) having a good trapped magnetic field and suspension force is used as a superconductor in a superconductive magnetic bearing. Moreover, for obtaining a strong magnetic stress, an NdFeB series or SmCo series rare earth sintered magnet that is a permanent magnet having a strong coercive force and a strong generated magnetic field is often used as a permanent magnet in the superconductive magnetic bearing.

Both the NdFeB series and SmCo series rare earth sintered magnets are produced by orienting raw material powders in a magnetic field, performing shaping and then performing sintering. For enhancing remanent magnetic flux density that is a magnetic characteristic, ideally, it is important for all powders to be oriented in the same direction at the time of the orientation, and therefore, the direction of the orientation of the magnet is parallel.

When the radial size of the superconductive magnetic bearing is relatively large, it is difficult to form a ring-shaped permanent magnet portion using a single permanent magnet. Therefore, the ring-shaped permanent magnet portion is constructed by arraying a plurality of permanent magnets in the circumferential direction.

As one method, a ring is constructed by arraying a plurality of magnets in the circumferential direction, and the magnetization direction of each magnet is caused to be a roughly radial direction. In the superconductive magnetic bearing, the magnetic field in the radial direction that is generated near an axial end surface of each magnet is used. A radial orientation in which each of the orientation directions of the magnets is the radial direction of the ring is ideal.

However, when the above-described parallelly oriented anisotropic sintered magnet is used, even if the magnetization direction is parallel to the radial direction of the ring (the angle between the magnetization direction and the radial direction is 0 degrees) at a certain portion of each magnet, for example, at a central portion, the angle between the magnetization direction and the radial direction is greater at a portion that is more distant from the central portion in the circumferential direction. When the number of the permanent magnets that constitute the ring is n, the angle between the magnetization direction of one permanent magnet of two permanent magnets adjacent in the circumferential direction and the magnetization direction of the other permanent magnet is (360/n) degrees.

In the case in which the magnetic field near an axial end surface of the ring-shaped permanent magnet portion that is generated by the ring-shaped permanent magnet portion is not uniform along the circumferential direction, the fluctuation or pulsation of the magnetic field is generated as magnetic friction during the rotation of a rotation shaft, and therefore, the rotation efficiency decreases, leading to heat generation.

In the case in which the ring is constructed using a plurality of parallelly oriented anisotropic sintered magnets, the magnetization directions of two permanent magnets adjacent in the circumferential direction cross near the contact surfaces of the two permanent magnets, as described above. Therefore, the magnetic field that is generated near the axial end surface of the magnet is not uniform along the circumferential direction. Moreover, in the case in which a plurality of permanent magnets is used, there is variation in magnetic characteristic among individual magnets, leading to a further decrease in the circumferential uniformity of the magnetic field.

Conventionally, for increasing the circumferential uniformity of the magnetic field, for example, there is a method in which rings made of a soft magnetic material such as pure iron and carbon steel are disposed on the inner circumferential side and outer circumferential side of the ring-shaped magnet portion respectively and in which magnetic flux is caused to pass through the rings made of the soft magnetic material. However, there is a problem in that magnetic field strength decreases when the radial thickness (the difference between the outer radius and the inner radius) of the ring made of the soft magnetic material is increased for the uniform magnetic field, and the uniformity is not particularly enhanced when the radial thickness is decreased.

Figure 2:
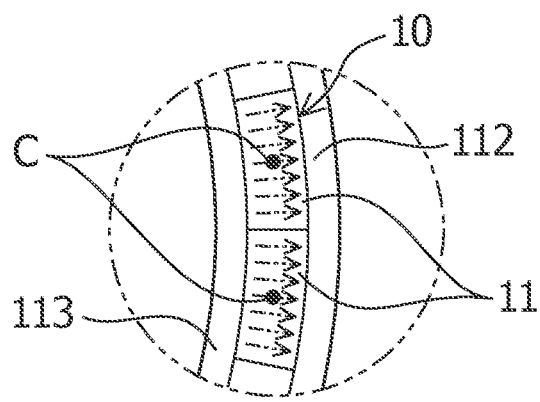
FIG. 2 is a partial enlarged view of FIG. 1.

As shown in FIG. 1 and FIG. 2, a magnetic circuit device 100 for a magnetic bearing includes a permanent magnet ring 10, and an outer circumferential side soft magnetic material ring 112 and an inner circumferential side soft magnetic material ring 113 that are provided so as to contact the outer circumferential surface and inner circumferential surface of the permanent magnet ring 10 respectively and that are made of the soft magnetic material. The permanent magnet ring 10 is formed by arraying, in a ring shape, 32 permanent magnets 11, each of which has a roughly circular arc shape and have roughly the same size. The permanent magnet 11, as a whole, is an anisotropic permanent magnet magnetized in a direction parallel to a straight line that passes through a center C and that extends in the radial direction. The outer circumferential surfaces of all permanent magnets 11 have the same polarity, and the inner circumferential surfaces also have the same polarity and have the reverse polarity of the polarity of the outer circumferential surface. For example, the outer circumferential surfaces are N-pole, and the inner circumferential surfaces are S-pole. The angle between the magnetization directions of two permanent magnets adjacent in the circumferential direction is 360/32=11.25 degrees.

Figure 3:
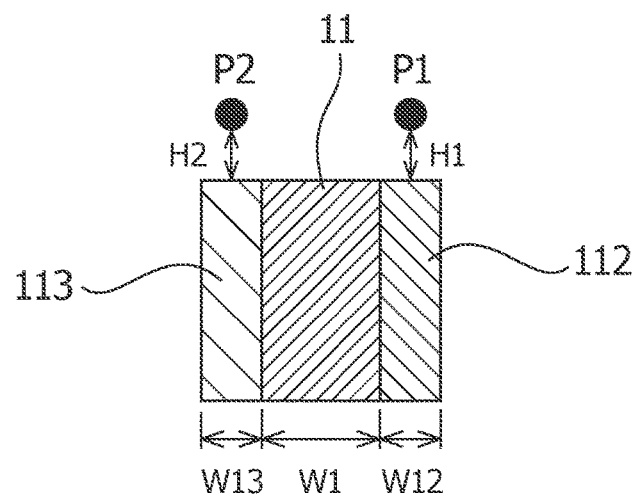
FIG. 3 is a Z-Z' line sectional view of FIG. 1.

FIG. 3 is a sectional view of the permanent magnet 11 in FIG. 1, taken along line Z-Z' that extends in the radial direction. Reference character W1 denotes the radial thickness (the difference between the outer radius and the inner radius) of the permanent magnet 11. Reference character W12 denotes the radial thickness (the difference between the outer radius and the inner radius) of the outer circumferential side soft magnetic material ring 112. Reference character W13 denotes the radial thickness (the difference between the outer radius and the inner radius) of the inner circumferential side soft magnetic material ring 113. Moreover, the position of contact surfaces of two permanent magnets 11 that are at the 3 o'clock position on the paper plane of FIG. 1 and that are adjacent in the circumferential direction is referred to as a 0-degree position, and a position that deviates from the 0-degree position by 45 degrees in the counterclockwise direction is referred to as a 45-degree position.

Reference character P1 denotes a circular arc of a later-described first virtual circle from the 0-degree position to the 45-degree position. As for the first virtual circle, the center is on the axis of the magnetic circuit device 100 for the magnetic bearing, and the radius is the value resulting from subtracting the value resulting from dividing the radial thickness W12 of the outer circumferential side soft magnetic material ring 112 by 2, from the outer radius of the magnetic circuit device 100 for the magnetic bearing. Furthermore, the first virtual circle is at a position that is 5 mm (reference character H1) away from an axial end surface of the outer circumferential side soft magnetic material ring 112 to the axial outside.

Reference character P2 denotes a circular arc of a later-described second virtual circle from the 0-degree position to the 45-degree position. As for the second virtual circle, the center is on the axis of the magnetic circuit device 100 for the magnetic bearing, and the radius is the value resulting from adding the value resulting from dividing the radial thickness W13 of the inner circumferential side soft magnetic material ring 113 by 2, to the inner radius of the magnetic circuit device 100 for the magnetic bearing. Furthermore, the second virtual circle is at a position that is 5 mm (reference character H2) away from an axial end surface of the inner circumferential side soft magnetic material ring 113 to the axial outside.

A SmCo series rare earth sintered magnet (grade R33H produced by the applicant) is used as the permanent magnet 11, and a carbon steel S45C is used as the outer circumferential side soft magnetic material ring 112 and the inner circumferential side soft magnetic material ring 113.

Figure 4:
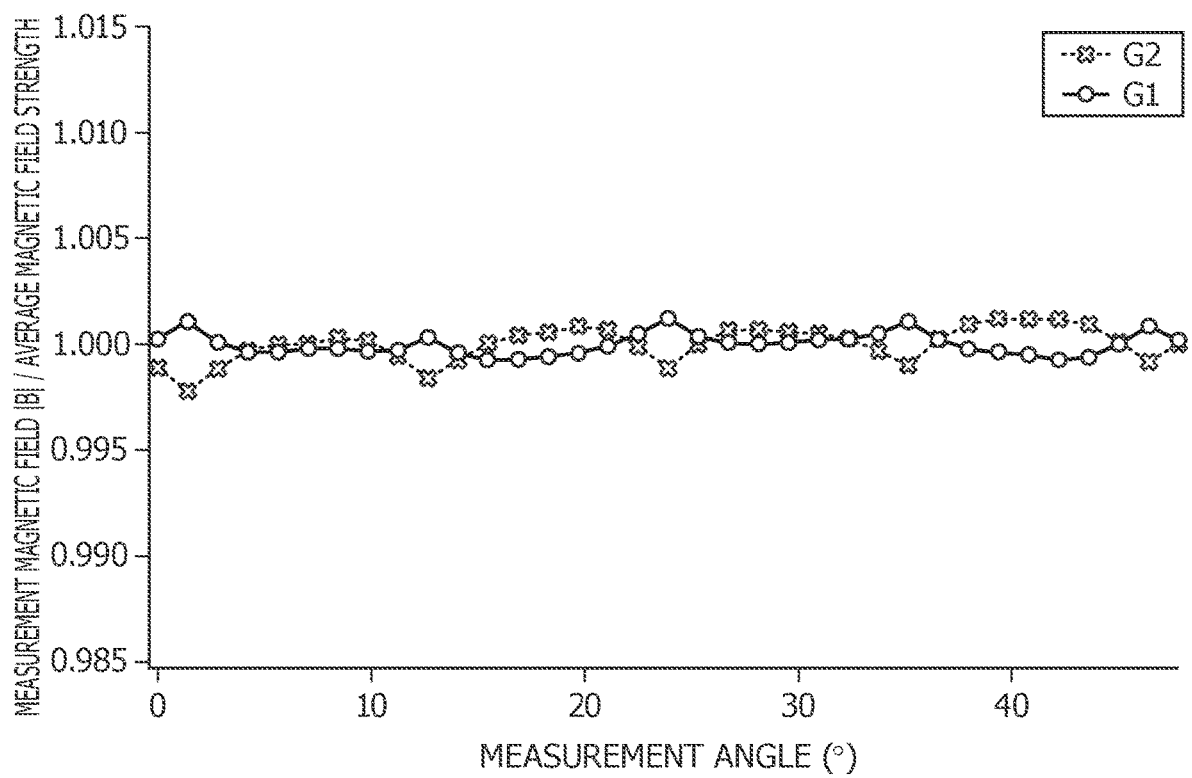
FIG. 4 is a graph showing the relationship between circumferential position and magnetic field in the magnetic circuit device for the magnetic bearing.

FIG. 4 shows changes in the magnetic fields along the circular arcs P1 and P2. The abscissa axis indicates the angle from the 0-degree position to the 45-degree position on the circular arcs P1 and P2, and the ordinate axis indicates the value resulting from dividing the magnitude |B| of the measurement magnetic field at the angular position on each circular arc by the average magnetic field strength of the whole of each circular arc. Polygonal line G1 indicates the magnetic field on the circular arc P1, and polygonal line G2 indicates the magnetic field on the circular arc P2.

From FIG. 4, it is found that the magnetic field generated near the axial end surface of the ring-shaped permanent magnet portion formed by combining the plurality of permanent magnets in a ring shape is not uniform along the circumferential direction. Specifically, as can be seen from polygonal line G1, it is found that the peak of the magnetic field is generated near the contact surfaces of the two adjacent permanent magnets (near the 0-degree position, near a 11.25-degree position, near a 22.5-degree position, near a 33.75-degree position, near the 45-degree position) on the circular arc P1. On the other hand, as can be seen from polygonal line G2, it is found that the peak of the magnetic field is generated near a circumferential central portion of each permanent magnet (near a 5.625-degree position, near a 16.875-degree position, near a 28,125-degree position, near a 39.375-degree position) on the circular arc P2.

An embodiment based on the above-described research result will be described below.

Figure 5:
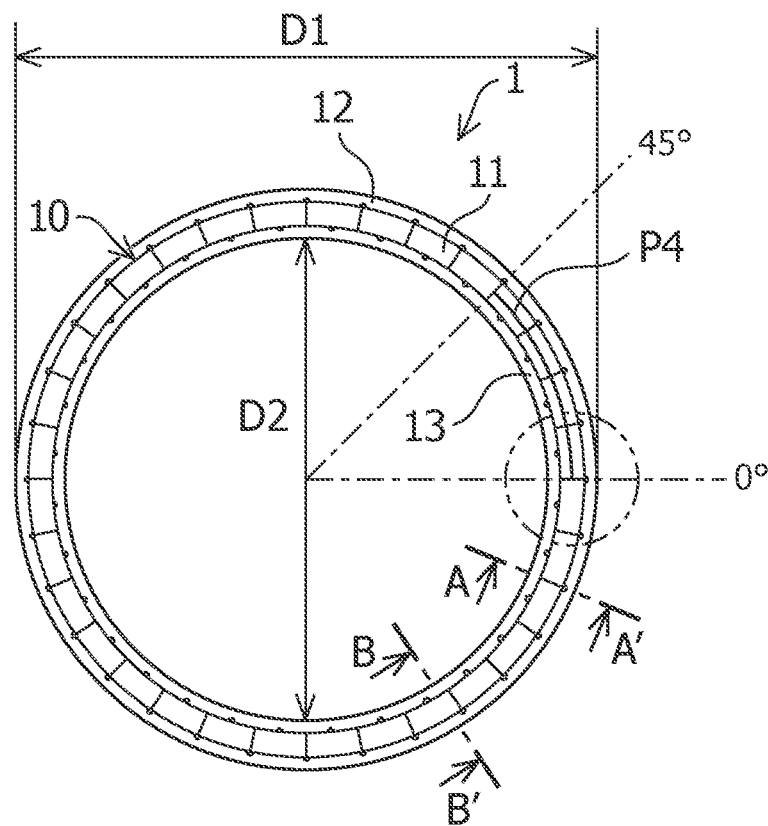
FIG. 5 is an elevational view of a magnetic circuit device for a magnetic bearing according to an embodiment.
Figure 6:
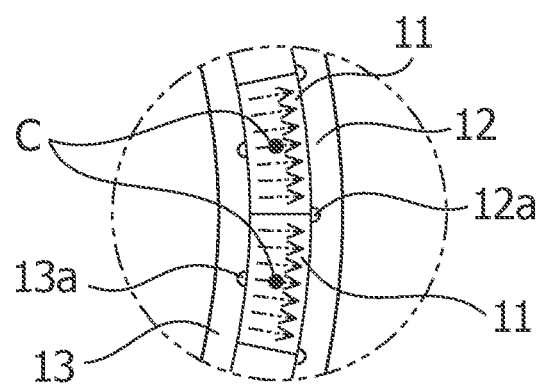
FIG. 6 is a partial enlarged view of FIG. 5.

As shown in FIG. 5 and FIG. 6, a magnetic circuit device 1 for a magnetic bearing includes a permanent magnet ring 10 formed by arraying, in a ring shape, 32 permanent magnet 11 each of which has a roughly circular arc shape and that have roughly the same size. This point is in common with the magnetic circuit device 100 for the magnetic bearing shown in FIG. 1 and FIG. 2.

The magnetic circuit device 1 for the magnetic bearing further includes an outer circumferential side soft magnetic material ring 12 and an inner circumferential side soft magnetic material ring 13 that are provided so as to contact the outer circumferential surface and inner circumferential surface of the permanent magnet ring 10 respectively and that are made of the soft magnetic material. On the inner circumferential surface of the outer circumferential side soft magnetic material ring 12, 32 slits (grooves) 12a that extend in the axial direction are formed. Each of the 32 slits 12a is formed at a position that faces, in the radial direction, the contact surfaces of two permanent magnets 11 adjacent in the circumferential direction. Furthermore, on the outer circumferential surface of the inner circumferential side soft magnetic material ring 13, 32 slits 13a that extend in the axial direction are formed. Each of the 32 slits 13a is formed at a position that faces the center C of the permanent magnet 11 in the radial direction.

Figure 7:
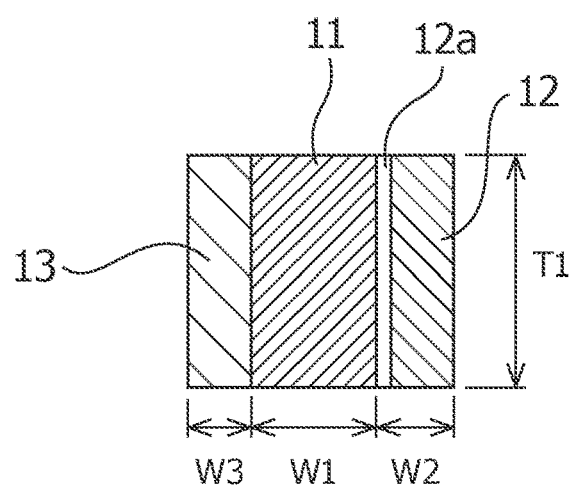
FIG. 7 is an A-A' line sectional view of FIG. 5.

In FIG. 5, the outer diameter D1 of the magnetic circuit device 1 for the magnetic bearing is 200 mm, and the inner diameter D2 is 160 mm. That is, the radial thickness (the difference between the outer radius and the inner radius) of the magnetic circuit device 1 for the magnetic bearing is 20 mm. In FIG. 7, the radial thickness W1 of the permanent magnet ring 10 is 10 mm, and each of the radial thickness W2 of the outer circumferential side soft magnetic material ring 12 and the radial thickness W3 of the inner circumferential side soft magnetic material ring 13 is 5 mm. The axial size T1 of the magnetic circuit device 1 for the magnetic bearing is 20 mm.

Figure 8:
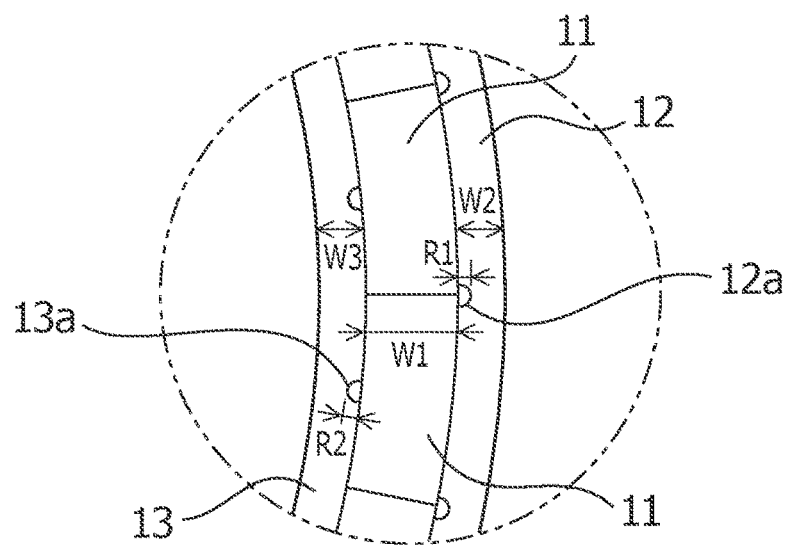
FIG. 8 is a partial enlarged view of FIG. 5.

FIG. 8 is a partial enlarged view of the magnetic circuit device 1 for the magnetic bearing. The slits 12a and 13a have a semicircular section, and each of radiuses R1 and R2 is 1.25 mm. Both slits have an axial length of 20 mm, that is, pass through the soft magnetic material ring from one axial end surface to the other axial end surface.

The depth of both slits that is 1.25 mm is 25% of the radial size of both soft magnetic material rings that is 5 mm, and therefore, is referred to as slit size 25%.

Returning to FIG. 1, reference character P3 denotes a circular arc of a third virtual circle (described later) from the 0-degree position to the 45-degree position. The third virtual circle is a concentric circle of the above-described first virtual circle and second virtual circle, and the radius is the sum of the inner radius of the magnetic circuit device 100 for the magnetic bearing, the radial thickness W13 of the inner circumferential side soft magnetic material ring 113, and the value resulting from dividing the radial thickness W1 of the permanent magnet 11 by 2. Furthermore, the third virtual circle is at a position that is 5 mm away from an axial end surface of the permanent magnet 11 to the axial outside.

Figure 9:
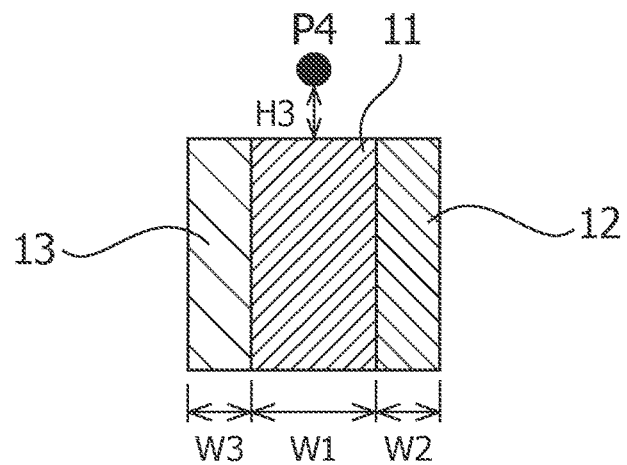
FIG. 9 is a B-B' line sectional view of FIG. 5.

Reference character P4 in FIG. 5 and FIG. 9 denotes a circular arc of a later-described fourth virtual circle from the 0-degree position to the 45-degree position. As for the fourth virtual circle, the center is on the axis of the magnetic circuit device 1 for the magnetic bearing, and the radius is the sum of the inner radius (the value resulting from dividing the inner diameter D2 by 2) of the magnetic circuit device 1 for the magnetic bearing, the radial thickness W3 of the inner circumferential side soft magnetic material ring 13, and the value resulting from dividing the radial thickness of the permanent magnet 11 by 2. Furthermore, the fourth virtual circle is at a position that is 5 mm (reference character H3) away from the axial end surface of the permanent magnet 11 to the axial outside.

The SmCo series rare earth sintered magnet (grade R33H produced by the applicant) is used as the permanent magnet 11, and the carbon steel S45C is used as the outer circumferential side soft magnetic material ring 12 and the inner circumferential side soft magnetic material ring 13.

Figure 10:
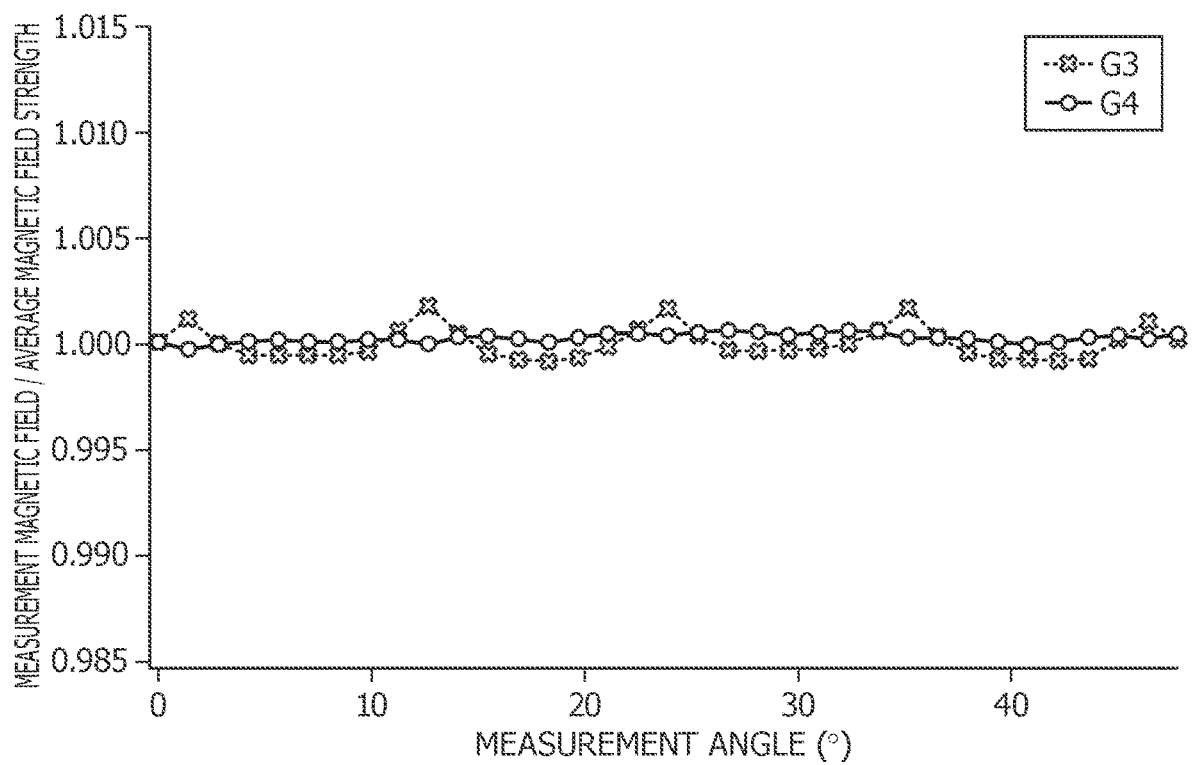
FIG. 10 is another graph showing the relationship between circumferential position and magnetic field in the magnetic circuit device for the magnetic bearing.

FIG. 10 shows the magnetic fields on the circular arcs P3 and P4. The abscissa axis indicates the angle from the 0-degree position to the 45-degree position on the circular arcs P3 and P4, and the ordinate axis indicates the value resulting from dividing the magnitude |B| of the measurement magnetic field at the angular position on each circular arc by the average magnetic field strength of the whole of each circular arc. Polygonal line G3 indicates the magnetic field on the circular arc P3, and polygonal line G4 indicates the magnetic field on the circular arc P4. The magnetic circuit device 1 for the magnetic bearing has a periodic configuration, and therefore, the measurement range of the magnetic field is set to a range from the 0-degree position to the 45-degree position.

From FIG. 10, it can be confirmed that the pulsation of the magnetic field is reduced and the uniformity of the magnetic field is enhanced in the case in which the slit having the slit size 25% is provided (polygonal line G4) compared to the case in which there is no slit (polygonal line G3).

Figure 11:
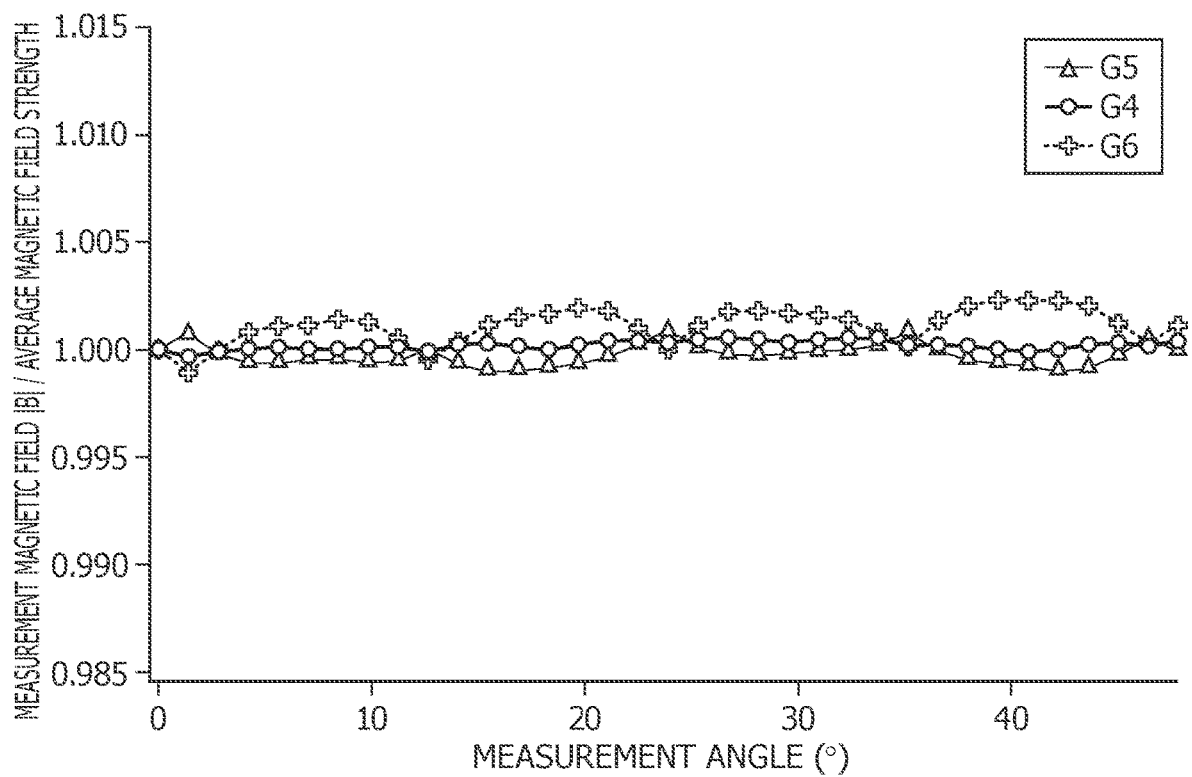
FIG. 11 is another graph showing the relationship between circumferential position and magnetic field in the magnetic circuit device for the magnetic bearing.

FIG. 11 shows the same polygonal line G4 as FIG. 10, and shows magnetic fields on the circular arc P4 when the slit size is set to 10% and 40% in the magnetic circuit device 1 for the magnetic bearing shown in FIG. 5, as polygonal lines G5 and G6, respectively. It can be confirmed that the pulsation of the magnetic field is reduced in the case in which the slit having the slit size 25% is provided compared to the cases of slit size 10% and slit size 40%.

Figure 12:
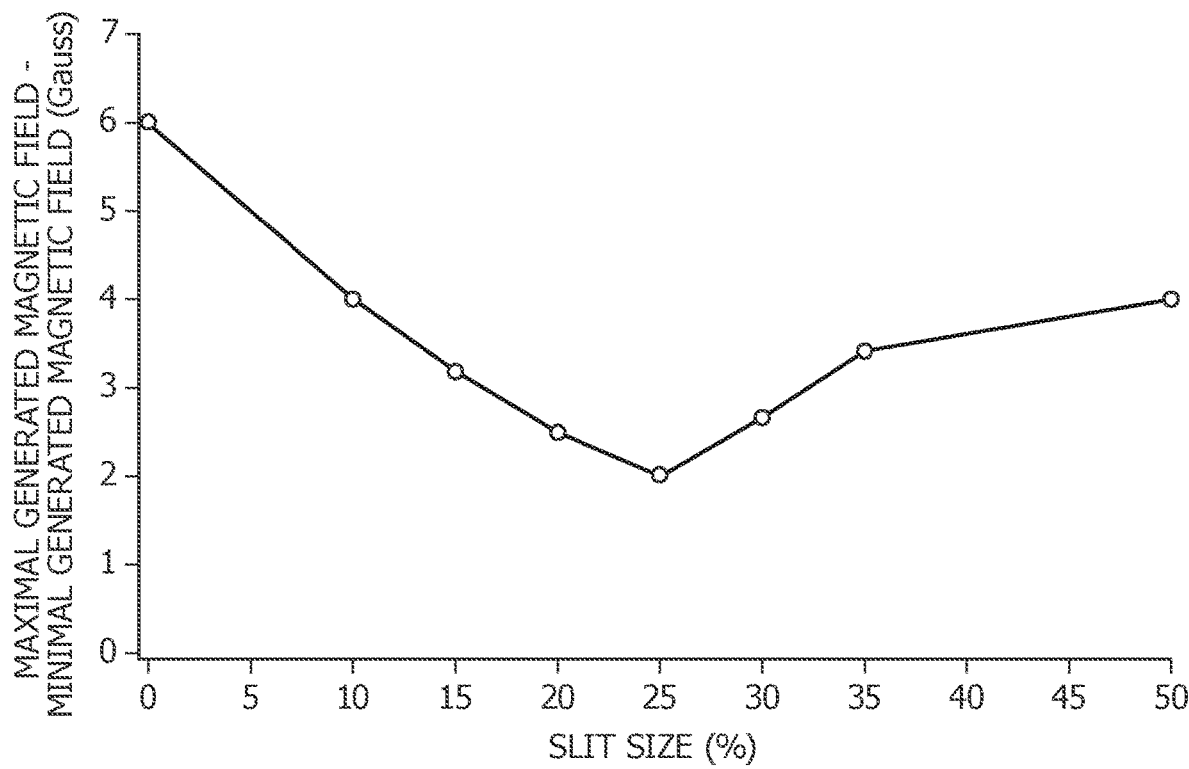
FIG. 12 is a graph showing the relationship between slit size and variation in magnetic field.

FIG. 12 shows the relationship between the slit size and the pulsation of the magnetic field. The abscissa axis indicates the slit size, and the ordinate axis indicates the value (unit: Gauss) resulting from subtracting a minimal generated magnetic field on the circular art P4 from a maximal generated magnetic field on the circular arc P4. From this result, it is found that the uniformity of the magnetic field is not enhanced when the slit size is excessively large or excessively small. Moreover, it can be confirmed that the difference between the maximal value and minimal value of the generated magnetic field falls below 4 Gauss and the uniformity of the magnetic field is enhanced when the slit size is set to 15% to 35%. Accordingly, it is preferable that the slit size be in a range from about 15% to about 35%.

As described above, by periodically providing the slit (groove) extending in the axial direction on the soft magnetic material ring, it is possible to enhance the circumferential uniformity of the magnetic field.

Moreover, the circumferential uniformity of the magnetic field tends to decrease when the radial thickness of the soft magnetic material ring is reduced for enhancing the magnetic field strength. According to the embodiment, each radial thickness of the two soft magnetic material rings is only about half of the radial thickness of the permanent magnet ring, and therefore, it is possible to achieve both the enhancement in the magnetic field strength and the enhancement in the circumferential uniformity of the magnetic field.

It is preferable that the slit be provided on the contact surface of the soft magnetic material ring that contacts the permanent magnet. It is preferable that the position of the slit be near the contact surfaces of two magnets adjacent in the circumferential direction, on the soft magnetic material ring that contacts the outer circumferential surface of the permanent magnet ring, and it is preferable that the position of the slit be near a position that faces the central portion of each magnet in the radial direction, on the soft magnetic material ring that contacts the inner circumferential surface of the permanent magnet ring.

The slit may be provided on both of the soft magnetic material ring on the outer circumferential side and the soft magnetic material ring on the inner circumferential side, or may be provided on only one of them.

It is preferable that the radial size and circumferential size of the slit relative to the soft magnetic material ring be about 15% to 35% of the radial thickness of the soft magnetic material ring, because an excessively large size rather degrades the uniformity of the magnetic field.

Moreover, it is preferable that the number of slits be an integral multiple of the number n of the permanent magnets in the permanent magnet ring. The shape of the slit as viewed in the axial direction is not limited to a semicircle, and may be a freely chosen shape such as a triangle and a quadrangle. The slit may be provided on the entire range from one axial end surface to the other axial end surface in the soft magnetic material ring, or it may be partially provided.

The magnetic circuit device for the magnetic bearing according to the embodiment is can be applied not only to a superconductive magnetic bearing on which a permanent magnet and a superconductor act, but also to general magnetic bearings including a magnetic bearing on which permanent magnets act and a magnetic bearing on which a permanent magnet and an electromagnet act.

The following supplemental information is disclosed about the embodiment described above.

Annex 1

A magnetic circuit device for a magnetic bearing comprising:
a permanent magnet ring that is formed by disposing a plurality of anisotropic permanent magnets in a circumferential direction;
a first soft magnetic material ring that contacts an outer circumferential surface of the permanent magnet ring; and
a second soft magnetic material ring that contacts an inner circumferential surface of the permanent magnet ring, wherein:
each of the plurality of anisotropic permanent magnets is magnetized parallel to a straight line that passes through a center of the anisotropic permanent magnet and that extends in a radial direction;
a whole of the outer circumferential surface of the permanent magnet ring has homopolarity, and the entirety of the inner circumferential surface of the permanent magnet ring has homopolarity and has a reverse polarity of the outer circumferential surface of the permanent magnet ring; and
grooves in an axial direction are formed on at least one of the first soft magnetic material ring and the second soft magnetic material ring.

Annex 2

The magnetic circuit device for the magnetic bearing according to annex 1, wherein the grooves are provided on a contact surface that contacts the permanent magnet ring.

Annex 3

The magnetic circuit device for the magnetic bearing according to annex 1 or 2, wherein a depth of the grooves is in a range of 15% to 35% of a radial thickness of the first soft magnetic material ring or the second soft magnetic material ring on which the grooves are formed.

Annex 4

The magnetic circuit device for the magnetic bearing according to annex 1 or 2, wherein the number of the grooves is an integral multiple of the number of the anisotropic permanent magnets that constitute the permanent magnet ring.

Annex 5

The magnetic circuit device for the magnetic bearing according to annex 2, wherein:
on the first soft magnetic material ring, each of the grooves is formed so as to face contact surfaces of two anisotropic permanent magnets in the radial direction, the two anisotropic permanent magnets being included in the plurality of anisotropic permanent magnets and being adjacent in the circumferential direction; and on the second soft magnetic material ring, the grooves are formed so as to face respective central portions of the plurality of anisotropic permanent magnets in the radial direction.

The embodiment of the present invention has been described above. The present invention is not limited to the above-described embodiment, and various modifications and alterations can be made based on the technical idea of the present invention.

REFERENCE SIGNS LIST

1, 100 Magnetic circuit device for magnetic bearing
10 Permanent magnet ring
11 Permanent magnet
12, 13, 112, 113 Soft magnetic material ring
12a, 13a Groove

What is claimed is:

1. A magnetic circuit device for a magnetic bearing comprising:
    a permanent magnet ring that is formed by disposing a plurality of anisotropic permanent magnets in a circumferential direction;
    a first soft magnetic material ring that contacts an outer circumferential surface of the permanent magnet ring; and
    a second soft magnetic material ring that contacts an inner circumferential surface of the permanent magnet ring, wherein:
    each of the plurality of anisotropic permanent magnets is magnetized parallel to a straight line that passes through a center of the anisotropic permanent magnet and that extends in a radial direction;
    an entirety of the outer circumferential surface of the permanent magnet ring has homopolarity, and an entirety of the inner circumferential surface of the permanent magnet ring has homopolarity and has a reverse polarity of the outer circumferential surface of the permanent magnet ring; and
    grooves in an axial direction are formed on at least one of the first soft magnetic material ring and the second soft magnetic material ring, a depth of the grooves being in a range of 15% to 35% of a radial thickness of the first soft magnetic material ring or the second soft magnetic material ring on which the grooves are formed.

2. The magnetic circuit device for the magnetic bearing according to claim 1, wherein the grooves are provided on a contact surface that contacts the permanent magnet ring.

3. The magnetic circuit device for the magnetic bearing according to claim 1, wherein the number of the grooves is an integral multiple of the number of the anisotropic permanent magnets that constitute the permanent magnet ring.

4. The magnetic circuit device for the magnetic bearing according to claim 2, wherein:
    on the first soft magnetic material ring, each of the grooves is formed so as to face contact surfaces of two anisotropic permanent magnets in the radial direction, the two anisotropic permanent magnets being included in the plurality of anisotropic permanent magnets and being adjacent in the circumferential direction; and
    on the second soft magnetic material ring, the grooves are formed so as to face respective central portions of the plurality of anisotropic permanent magnets in the radial direction.

* * * * *